(12) United States Patent
Perks et al.

(10) Patent No.: US 12,174,823 B2
(45) Date of Patent: Dec. 24, 2024

(54) SYSTEM AND METHOD TO ENSURE DATA INTEGRITY OF SOFTWARE DEFINED STORAGE SYSTEM

(71) Applicant: Dell Products L.P., Round Rock, TX (US)

(72) Inventors: Michael Albert Perks, Austin, TX (US); John R. Stuewe, Round Rock, TX (US); Scott Robert Bruns, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 154 days.

(21) Appl. No.: 18/048,662

(22) Filed: Oct. 21, 2022

(65) Prior Publication Data

US 2024/0134843 A1   Apr. 25, 2024
US 2024/0232166 A9   Jul. 11, 2024

(51) Int. Cl.
*G06F 16/23* (2019.01)
*G06F 16/27* (2019.01)

(52) U.S. Cl.
CPC .......... *G06F 16/2365* (2019.01); *G06F 16/27* (2019.01)

(58) Field of Classification Search
CPC .... G06F 16/2365; G06F 16/27; G06F 16/273; G06F 16/275; G06F 16/278
USPC ........................................................ 707/691
See application file for complete search history.

(56) References Cited

U.S. PATENT DOCUMENTS

| | | | |
|---|---|---|---|
| 5,602,721 | A | 2/1997 | Slade et al. |
| 5,761,033 | A | 6/1998 | Wilhelm |
| 7,698,095 | B2 | 4/2010 | Chung et al. |
| 7,701,713 | B2 | 4/2010 | Li |
| 8,182,319 | B2 | 5/2012 | Ong et al. |
| 8,550,702 | B2 | 10/2013 | Campbell et al. |
| 9,129,958 | B2 | 9/2015 | Mallik et al. |
| 9,237,671 | B2 | 1/2016 | Chen et al. |
| 9,820,411 | B2 | 11/2017 | Alshinnawi et al. |
| 10,123,452 | B2 | 11/2018 | Chen et al. |
| 10,177,107 | B2 | 1/2019 | Camarota |
| 10,274,945 | B2 | 4/2019 | Arensmeier et al. |
| 10,709,032 | B1 | 7/2020 | Holyoake et al. |
| 11,019,748 | B2 | 5/2021 | Avvaru et al. |
| 11,064,808 | B2 | 7/2021 | Chen et al. |
| 11,129,293 | B2 | 9/2021 | Wurmfeld |
| 11,262,809 | B2 | 3/2022 | Pham et al. |
| 11,293,659 | B2 | 4/2022 | Brahme et al. |
| 11,320,164 | B2 | 5/2022 | Roth |
| 11,321,006 | B1* | 5/2022 | Grunwald ............... G06F 3/065 |
| 11,539,793 | B1* | 12/2022 | Karumbunathan ......................... H04L 67/1095 |
| 11,620,197 | B2* | 4/2023 | Davis ................ G06F 3/0619 714/6.24 |
| 2001/0040203 | A1 | 11/2001 | Brock et al. |

(Continued)

*Primary Examiner* — Michael Pham
(74) *Attorney, Agent, or Firm* — Womble Bond Dickinson (US) LLP

(57) ABSTRACT

Methods, systems, and devices for storing data are provided. To store data, a data storage system may include multiple storage nodes and a support node. Copies of data may be stored in the storage nodes. When the data stored by the storage nodes appears to be inconsistent, metadata from the support node may be used to resolve the inconsistencies. The storage nodes and support node may be integrated into a single chassis. The chassis may be a form factor compliant chassis such as a rack unit compliant chassis for mounting to rack rails.

20 Claims, 6 Drawing Sheets

(56) References Cited

U.S. PATENT DOCUMENTS

| | | |
|---|---|---|
| 2011/0100668 A1 | 5/2011 | Syed |
| 2011/0228473 A1 | 9/2011 | Anderson et al. |
| 2012/0030170 A1* | 2/2012 | Bernbo ................... G06F 16/27 707/634 |
| 2012/0229971 A1 | 9/2012 | Mills et al. |
| 2014/0334084 A1 | 11/2014 | Fricker |
| 2015/0177750 A1 | 6/2015 | Bailey et al. |
| 2015/0180234 A1 | 6/2015 | Bailey et al. |
| 2015/0289405 A1 | 10/2015 | Stewart et al. |
| 2015/0359146 A1 | 12/2015 | Bailey et al. |
| 2016/0044819 A1 | 2/2016 | Bailey et al. |
| 2017/0177007 A1 | 6/2017 | Shelnutt et al. |
| 2017/0181329 A1 | 6/2017 | Shelnutt et al. |
| 2018/0011522 A1 | 1/2018 | Shirakami et al. |
| 2022/0104380 A1 | 3/2022 | Hattangadi et al. |
| 2022/0200250 A1 | 6/2022 | Brooks et al. |

\* cited by examiner

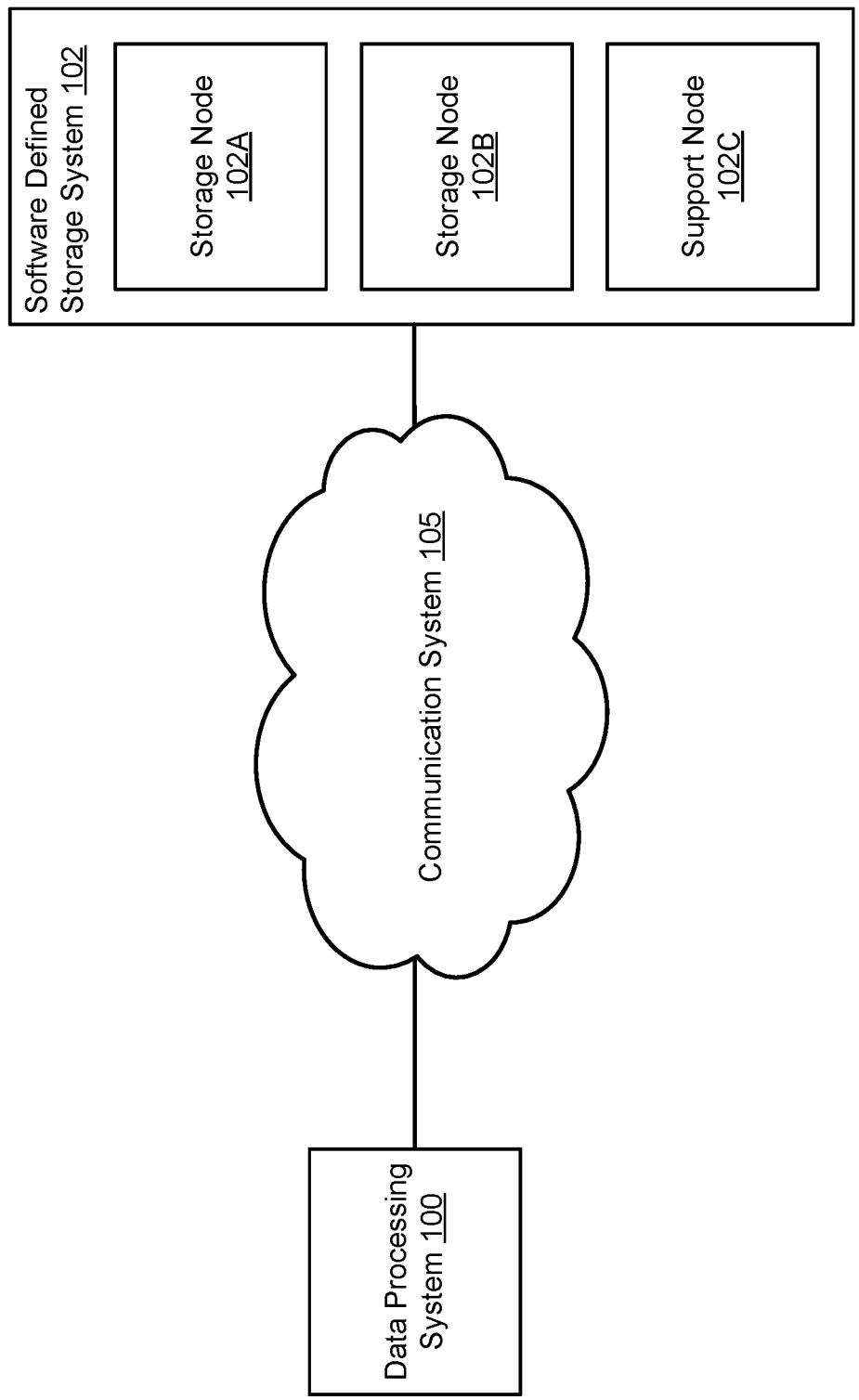

SYSTEM AND METHOD TO ENSURE DATA INTEGRITY OF SOFTWARE DEFINED STORAGE SYSTEM

FIELD OF THE EMBODIMENTS

Embodiments disclosed herein relate generally to data storage. More particularly, embodiments disclosed herein relate to systems and methods for managing data storage systems.

BACKGROUND

Computing devices may store data and used stored data. For example, computing devices may utilize data when providing computer implemented services. If computing devices are unable to access data, process data, and/or perform other functions, then the computing devices may be unable to provide some, or all, of the computer implemented services desired by users of the computing devices.

BRIEF DESCRIPTION OF THE DRAWINGS

Embodiments are illustrated by way of example and not limitation in the figures of the accompanying drawings in which like references indicate similar elements.

FIG. 1 shows a diagram illustrating a system in accordance with an embodiment.

DETAILED DESCRIPTION

Figure 2A:
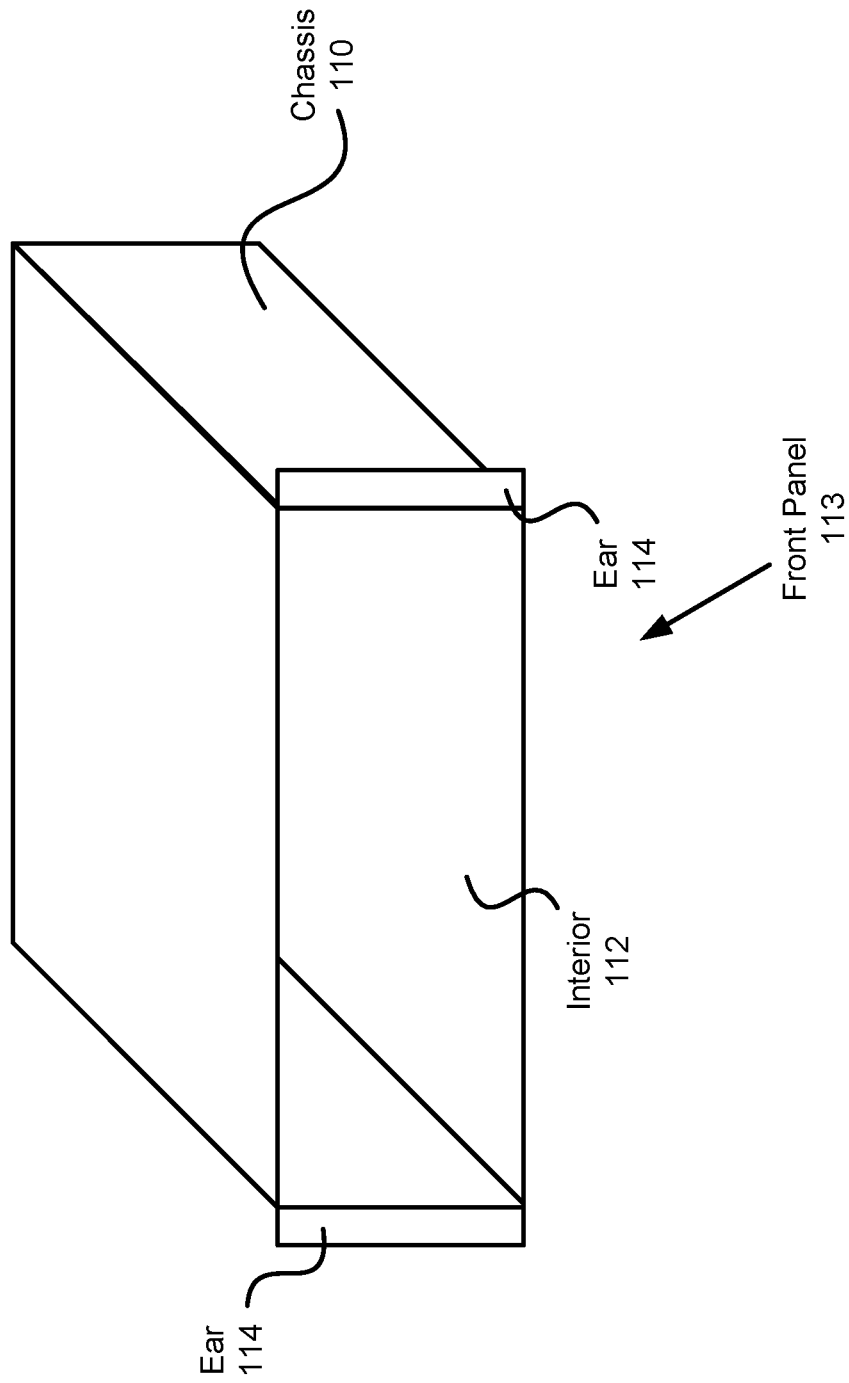
FIG. 2A shows a diagram of a chassis in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References in the specification to "adapted to" may, in the context of a programmable device, indicate that the programmable device has been programmed to perform the functionality described with respect to the programmable devices. In the context of a static device, "adapted to" may indicate that the device include circuitry to perform the functionality described with respect to the static devices. In the context of mechanical device, "adapted to" may mean that the mechanical device is designed to perform a particular function and may include a shape, size, structure, components thereof, etc. to accomplish the function.

In general, embodiments disclosed herein relate to methods, systems, and devices for providing computer implemented services. The computer implemented services may include any quantity and type of such services.

When the computer implemented services are provided, data may be generated, stored, and accessed. A data storage system may be used to manage the data.

To improve data throughput and redundancy, the data storage system may include multiple storage nodes. The storage nodes may cooperatively service data access requests.

To cooperative services the data access requests, the view of the data by each of the storage nodes may need to be consistent. For example, if two storage nodes store redundant copies of data, inconsistencies between the two copies may be problematic.

To address inconsistencies, the data storage system may implement a voting process through which correct data usable to resolve inconsistencies is identified. However, to identify the correct data, an add number of votes may need to be case so that a majority vote may be identified.

To facilitate inconsistency resolution in scenarios in which only two storage nodes are present, a support node may be used. The support node may case a vote thereby ensuring that a majority vote is found.

The storage nodes and support node may be integrated into a single chassis. The chassis may be a form factor compliant chassis, such as a one rack unit ("1U") chassis for rack mounting. By integrating the support node and storage nodes into a single chassis, it may be more likely that all of the votes in a voting process are available and the footprint of the data storage system may be reduced.

Thus, embodiments disclosed herein may address the technical problem of resource density in computing environment. The disclosed embodiments may address this problem by providing a data storage systems that include all of the components necessary for inconsistency resolution in a single chassis. Accordingly, more data storage systems may be more tightly packed in a similar space (e.g., when compared to spreading the components of a data processing system across multiple chassis).

In an embodiment, a data storage system is provided. The data processing system may include a chassis; a first storage node positioned in the chassis, the first storage node being adapted to maintain a first copy of data stored by the data storage system; a second storage node positioned in the chassis, the second storage node being adapted to maintain a second copy of the data stored by the data processing system; and a support node positioned in the chassis, the support node being adapted to: maintain metadata for the data stored in the data storage system; when the first storage node and the second storage node have an inconsistency in the data stored by the data storage system, participate in a resolution process to resolve the inconsistency between the first copy of the data and the second copy of the data.

The resolution process may include a quorum based voting process.

The quorum based voting process may include making a determination, using the metadata, regarding whether the first copy of the data or the second copy of the data comprises an inconsistency with the data stored by the data storage system.

The data storage system may also include a data management service hosted by the data storage system, the data management service being adapted to: in a first instance of the determination where the first copy of the data is inconsistent with the data stored on the data storage system, update the first copy of the data to be consistent with the second copy of the data; and in a second instance of the determination where the second copy of the data is inconsistent with the data stored on the data storage system, update the second copy of the data to be consistent with the first copy of the data.

The data management service may be a distributed application that operates using computing resources of the first storage node, the second storage node, and the support node.

The first storage node may not store any copies of the data of the data processing system.

The support node may include fewer computing resources than the first storage node, and the support node may include fewer computing resources than the second storage node.

Each of the first storage node, the second storage node, and the support node may include a data processing system, the data processing system comprising independent computing resources managed by software hosted by the data processing system.

The first storage node may be further adapted to: maintain second metadata for the first copy of the data stored by the data processing system, while the first storage node and the second storage node do not have the inconsistency in the data stored by the data storage system, the second metadata is consistent with the metadata.

The second storage node may be further adapted to: maintain third metadata for the second copy of the data stored by the data processing system, while the first storage node and the second storage node have an inconsistency in the data stored by the data storage system, the third metadata is consistent with the metadata.

The chassis may include a front panel (e.g., 113) through which the first storage node, the second storage node, and the support node may be physically accessed.

The support node may occupy less than 10% of an area of the front panel (e.g., front area of the chassis).

The support node may occupy less than 10% of a volume of an interior of the chassis.

The data storage system may also include a power supply that provides power to at least one of the first storage node, the second storage node, and the support node.

In an embodiment, a method for operating a data storage system is provided. The data storage system may include a chassis, a first storage node positioned in the chassis, a second storage node positioned in the chassis, and a support node positioned in the chassis. The method may include maintaining, by the first storage node, a first copy of data stored by the data storage system; maintaining, by the second storage node, a second copy of the data stored by the data storage system; maintaining, by the support node, metadata for the data stored in the data storage system; and when the first storage node and the second storage node have an inconsistency in the data stored by the data storage system, participating, by the storage node, in a resolution process to resolve the inconsistency between the first copy of the data and the second copy of the data.

The resolution process may include a quorum based voting process.

The quorum based voting process may include making a determination, using the metadata, regarding whether the first copy of the data or the second copy of the data comprises an inconsistency with the data stored by the data storage system.

The method may also include, in a first instance of the determination where the first copy of the data is inconsistent with the data stored on the data storage system, updating the first copy of the data to be consistent with the second copy of the data; and in a second instance of the determination where the second copy of the data is inconsistent with the data stored on the data storage system, updating the second copy of the data to be consistent with the first copy of the data.

The first copy of the data may be updated by a data management service comprising a distributed application that operates using computing resources of the first storage node, the second storage node, and the support node.

The method may also include maintaining, by the first storage node, second metadata for the first copy of the data stored by the data processing system, while the first storage node and the second storage node do not have the inconsistency in the data stored by the data storage system, the second metadata is consistent with the metadata.

In an embodiment, a non-transitory computer readable media storing instructions is provided. The instructions may cause the method, discussed above, to be performed when the instructions are executed by a processor.

Turning to FIG. 1, a diagram illustrating a system in accordance with an embodiment is shown. The system may provide computer implemented services. To provide the computer implemented services, the system may include data processing system 100.

Data processing system 100 may include functionality to provide various types of computer implemented services. The computer implemented services may include any number and type of computer implemented services. The computer implemented services may include, for example, database services, data processing services, electronic communication services, and/or any other services that may be provided using one or more computing devices. Other types of computer implemented services may be provided by data processing system 100 without departing from embodiments disclosed herein.

To provide the computer implemented services, data processing system 100 may process data and store data, at least in part, in software defined storage system 102. Software defined storage system 102 may provide data storage services. The data storage services may include storing copies of data and providing copies of stored data.

Software defined storage system 102 may include storage nodes (e.g., 102A, 102) and a support node. To improve the quality of data storage services, storage nodes 102A-102B may cooperatively store data. For example, storage nodes 102A-102B may redundantly store copies of data, may independently process data access requests (e.g., read and/or writes of data), etc. However, to do so, storage nodes 102A-102B may need to have a consistent view of the data stored in software defined storage system 102.

For example, if a write request for data is received by one of the data storage nodes but is not propagated to the other storage node (e.g., while the other storage node is unavailable due to being powered off, a restart, network communication issues, etc.), the copies of the data stored by the storage nodes may be inconsistent with one another.

To resolve inconsistencies, software defined storage system 102 may implement a distributed management system that includes a voting system. For example, members of the distributed management system may each vote on the states of various portions of data when the separate copies of the data maintained by the respective storage nodes are inconsistent.

However, in a scenario in which there are only two storage nodes (or an even number), the voting system may become deadlocked (e.g., if there an equal number of votes case for two different states of the data). To resolve deadlocks, software defined storage system may include support node 102C. Support node 102C may cast votes as part of the voting system to ensure that deadlocks do not occur as part of the distributed management system.

Figure 2B:
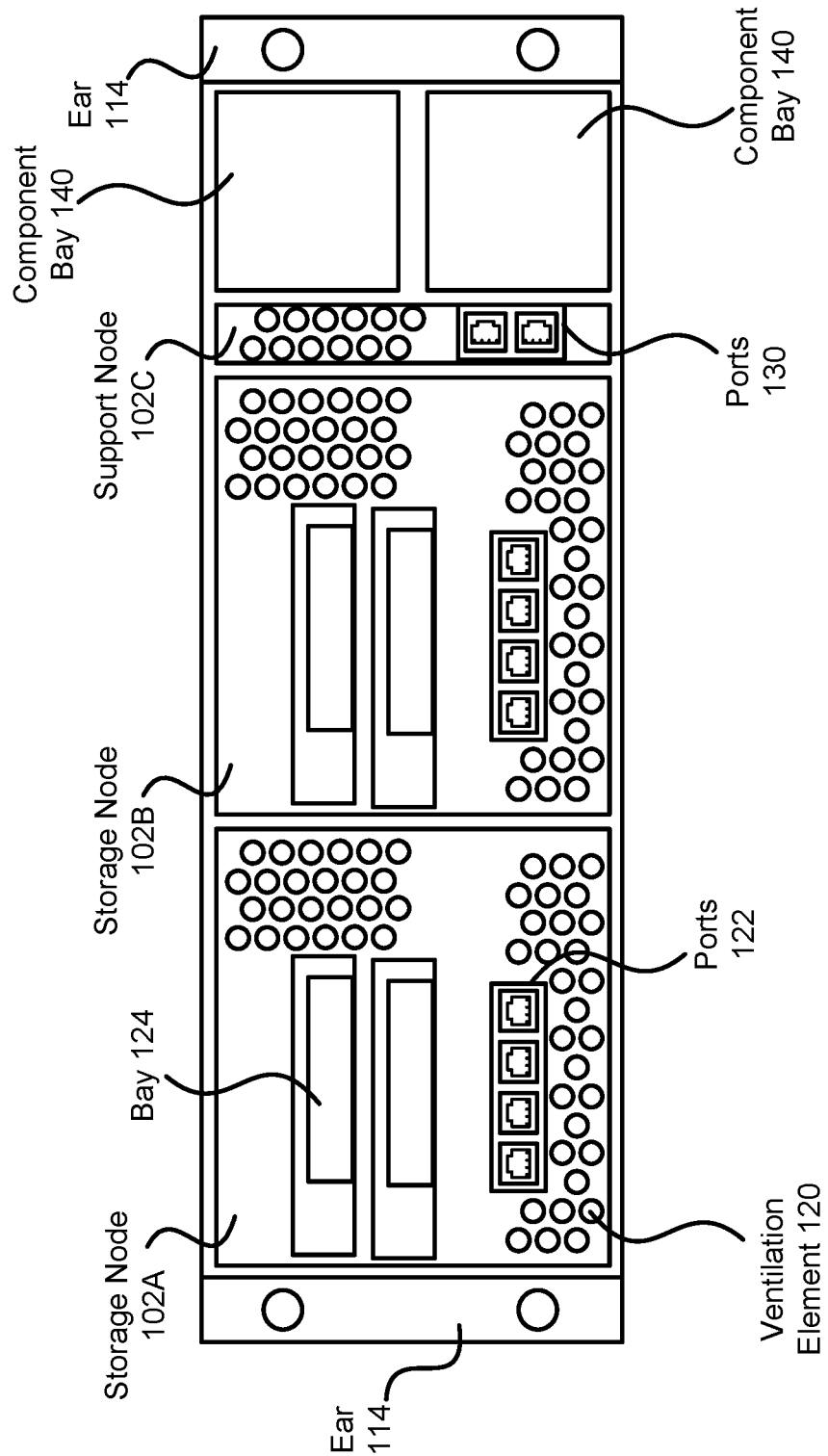
FIG. 2B shows a diagram of a chassis and a storage system in accordance with an embodiment.
Figure 2C:
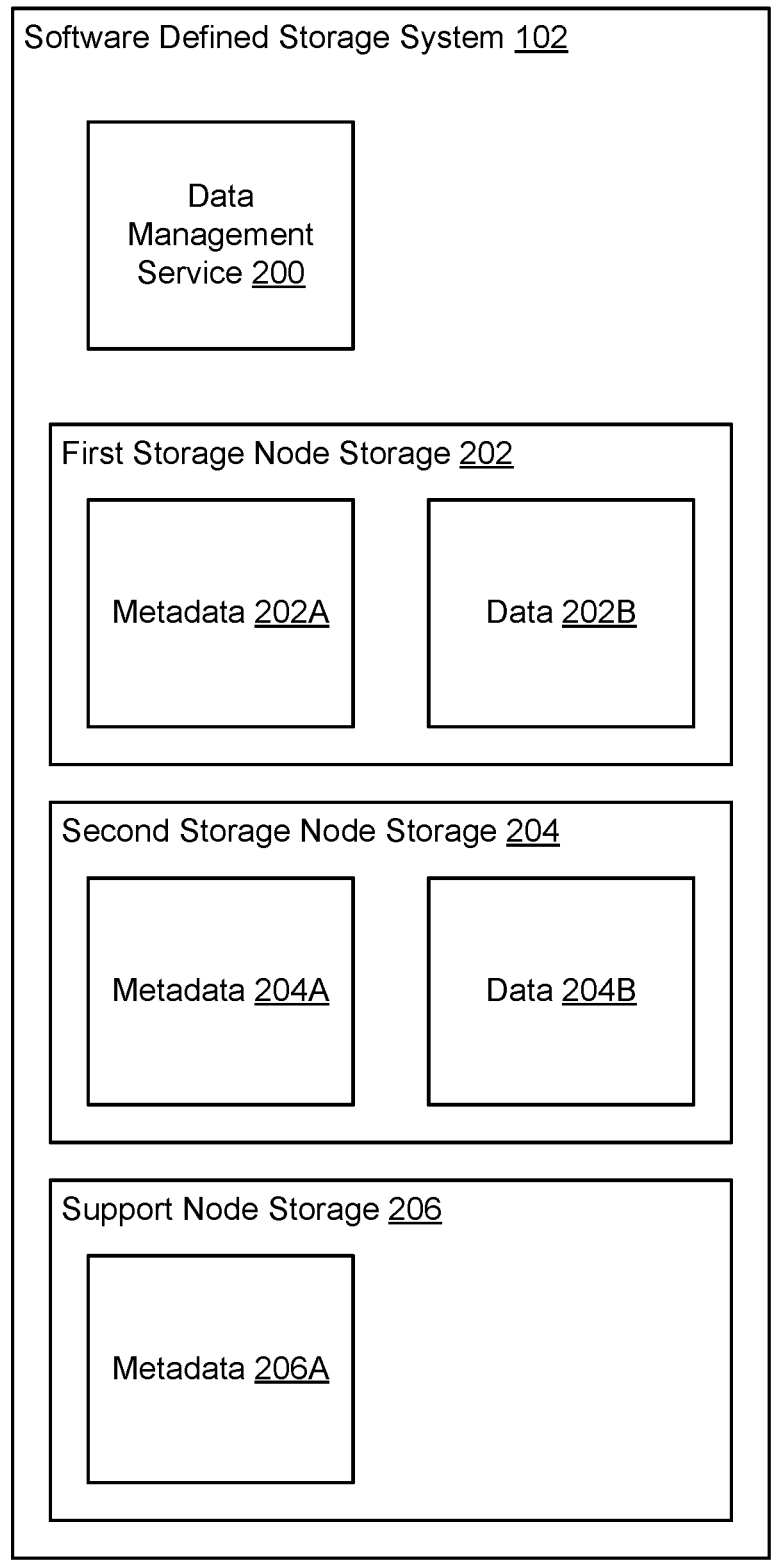
FIG. 2C shows a block diagram of a storage system in accordance with an embodiment.

In general, embodiments disclosed herein relate to systems, methods, and devices for implementing software defined storage systems. To implement the software defined storage systems, the components of the software defined storage system may be modularized and integrated into a single chassis. By doing so, a data storage system may have a reduced size footprint that may facilitate increased storage density in computing environments. Refer to FIGS. 2A-2C for additional details regarding software defined storage systems integrated into chassis.

To implement software defined storage system 102, each of storage node 102A, storage node 102B, and support node 102C may be implemented using a data processing system that operates independently. For example, each of the components of software defined storage system 102 may include an independent compute complex (e.g., processors, memory modules), independent storage (e.g., solid state disks, etc.), independent communication systems (e.g., network interface cards), etc.

Of the data processing systems (e.g., 100, portions of 102A-102C) may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 4.

The data processing systems may host various management components that may orchestrate operation of storage node 102A, storage node 102B, and support node 102C. The management components may be implemented with, for example, distributed applications (e.g., agents hosted by these components of software defined storage system 102), independent applications that cooperate and communicate via message passing or other communication systems, etc.

The management components may, for example, (i) manage servicing of data access requests, (ii) maintain copies of the data managed by software defined storage system 102 that is stored in storage node 102A and storage node 102B for consistency, (iii) maintain metadata that is stored in support node 102C usable to resolve inconsistencies, and (iii) when the copies of the data become inconsistent (e.g., due to communication issues, device downtime, and/or other reasons), perform a resolution process to address the inconsistencies. Refer to FIG. 2C for additional details regarding the management components.

While illustrated in FIG. 1 with a limited number of specific components, a software defined storage system may include additional, fewer, and/or different components without departing from embodiments disclosed herein.

As discussed above, software defined storage system 102 may be implemented using a chassis. Turning to FIG. 2A, a diagram of chassis 110 in accordance with an embodiment is shown.

Chassis 110 may include a structure for housing two storage nodes, a support node, and/or other components. By incorporating the storage nodes with the support node, the footprint for software defined storage system 102 may be reduced when compared to implementations where the support node is housed in other chassis from those that may house the storage nodes.

The structure may be an enclosure in which various components, subsystems, and/or other components may be positioned. For example, the support node and storage nodes may be modularized and have shapes that fit within interior 112 of chassis 110. The enclosure may comply with a specification such as a rack mount enclosure specification.

For example, chassis 110 may be adapted to mount to a rack with a particular bolting pattern on a set of front rails of a rack. The rack may implement a rack unit standardization system where the rack rails include a pattern of mounting features (e.g., holes) that facilitate integration of chassis that have particular heights (e.g., a rack unit, 1.75" or other heights) based on the spacing of the pattern of the mounting features.

To retain chassis 110 in the computing environment, chassis 110 may include ears (e.g., 114) extending laterally from a front face of chassis 110. The ears may be positioned to facilitate attachment to the rack rails of a rack. The ears may be implemented with plates. While not shown in FIG. 2A, the ears may include handles, holes, and/or other features to facilitate movement of an securing of chassis 110.

While illustrated in FIG. 2A with a limited number of specific components, a chassis may include additional, fewer, and/or different components without departing from embodiments disclosed herein.

Turning to FIG. 2B, a front view diagram of chassis 110 with storage node 102A, storage node 102B, and support node 102C positioned therein in accordance with an embodiment is shown. The storage nodes may be similar to one another, and each may include any of the features discussed with respect to the other. As discussed above, the components of a software defined storage system may be modularized to fit within a chassis (e.g., that is compatible with a rack system).

While positioned in the chassis, storage node 102A, storage node 102B, and support node 102C may be powered and cooled. To power these components, chassis 110 may include component bays 140. The component bays 140 may receive power supplies, battery packs (e.g., for battery backup), and/or other types of components that may provide support services to storage node 102A, storage node 102B, and support node 102C.

To facilitate provisioning of the support services, chassis 110 may include various distributions systems such as a power distribution system. The power distribution system may include a power bus (e.g., a bus bar, cabling, etc.) that transfers power between a power supply in one of the component bays (e.g., 140) and storage node 102A, storage node 102B, and/or support node 102C.

The component bays may be implemented with a portion of the interior of chassis 110. A front frame may also be positioned at the front of chassis 110. The front frame may facilitate positioning and retention of devices in the component bays.

To provide the data storage services, discussed above, storage node 102A may include features on a front face while positioned in chassis 110. The features may include ventilation elements (e.g., 120), ports 122, and bays (e.g., 124).

The ventilation elements may facilitate a flow of gas (e.g., air from an ambient environment, cooled gas from an heating/cooling/ventilation system, etc.) proximate to the components of storage node 102A. For example, ventilation element 120 may be implemented with a hole in an enclosure of storage node 102A. The hole may be of any shape and size.

An number of holes may be positioned on both front and rear (not shown) faces of the enclosure of storage node 102A. The holes may be in various patterns, and any of the holes may be of similar or different sizes. The holes on the front and rear of the enclosure of storage node 102A may define a gas flow path through an interior of storage node 102A. Various hardware components (e.g., storage devices, processors, etc.) may be positioned along the gas flow path to facilitate cooling of the hardware components.

Ports 122 may facilitate formation of operable connections with other devices. For example, ports 122 may be implemented with receptacles for cabling connectors. When a connector is attached to a port, an electrical connection may be formed thereby communication between storage node 102A and other devices (reachable via the cabling).

The bays (e.g., 124) of storage node 102A may facilitate operable connection of various hardware components to the hardware components of storage node 102A. For example, any of the bays may facilitate swapping of hardware components (e.g., storage devices). The bays may facilitate hot swapping (e.g., while storage node 102A operates) of hardware components.

To provide its functionality, as noted above, storage node 102A may also include storage devices such as hard disk drives, solid state drives, etc. These hardware components may require significant space due to their sizes. However, to store significant quantities of data, storage node 102A may require that these devices be present.

Storage node 102B may be similar to storage node 102A, and may include similar hardware components. Consequently, both storage node 102A and 102B may require significant space due to the physical sizes of their hardware components.

In contrast to the storage nodes, support node 102C may be implemented with fewer hardware components. For example, support node 102C may include fewer storage devices because support node 102C may only need to store metadata (in contrast to actual data) to perform its function as part of a software defined storage system. Like the storage nodes, support node 102C may include ventilation elements and ports (e.g., 130).

Thus, as illustrated in FIG. 2B, support node 102C may occupy much less space than the other components positioned in the chassis. For example, the front face of support node 102C may occupy less than 10% of the area of the front of chassis 110. In contrast, the fronts of the storage nodes may occupy more than 70% of the area of the front of chassis.

Similarly, due to the much smaller number of hardware components, support node 102C may occupy less than 10% of the volume of interior 112 of chassis 110.

When positioned in chassis 110, the storage nodes and support node may be operably connected to one another via communication system 105 as seen in FIG. 1. The communication system may include cabling that operably connects ports 122, 130.

To provide its functionality, communication system 105 may be implemented with one or more wired and/or wireless networks. Any of these networks may be private, public, and/or may include the Internet.

To provide its functionality, software defined storage system 102 may include various services and storage data in any of storage node 102A, storage node 102B, and support node 102C. Turning to FIG. 2C, a block diagram of software defined storage system 102 in accordance with an embodiment is shown.

To provide its functionality, software defined storage system 102 may include data management service 200, first storage node storage 202, second storage node storage 204, and support node storage 206. Each of these components is discussed below.

Data management service 200 may provide the data storage services provided by software defined storage system 102. To provide its functionality, data management service 200 may perform all, or a portion, of the method shown in FIG. 3.

Data management service 200 may be implemented with, for example, a distributed application hosted by storage node 102A, storage node 102B, and support node 102C. For example, any of storage node 102A, storage node 102B, and support node 102C may store instructions that when executed by a processor of the respective node cause the respective node to provide all, or a portion, of the functionality of data management service 200.

First storage node storage 202, second storage node storage 204, and support node storage 206 (collectively referred to as "storage resources of the nodes") may represent the data storage capability of the respective nodes.

In an embodiment, one or more of first storage node storage 202, second storage node storage 204, and support node storage 206 is implemented using physical devices that provide data storage services (e.g., storing data and providing copies of previously stored data). The devices that provide data storage services may include hardware devices and/or logical devices. For example, first storage node storage 202, second storage node storage 204, and/or support node storage 206 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, first storage node storage 202, second storage node storage 204, and/or support node storage 206 may include a memory device (e.g., a dual in line memory device) in which data is stored and from which copies of previously stored data are provided. In another example, first storage node storage 202, second storage node storage 204, and/or support node storage 206 may include a persistent storage device (e.g., a solid-state disk drive) in which data is stored and from which copies of previously stored data is provided. In a still further example, first storage node storage 202, second storage node storage 204, and/or support node storage 206 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

First storage node storage 202, second storage node storage 204, and/or support node storage 206 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

To provide the data storage services, data management service 200 may attempt to store copies of data obtained by software defined storage system 102 as data 202B and data 204B. When doing so, copies of metadata 202A, 204A, 206A for the data may also be stored across the storage nodes.

However, the data stored as data 202B, 204B may become inconsistent (e.g., due to write errors, downtime of the storage nodes, etc.). When data 202B, 204B is identified as inconsistent, the copies of metadata 202A, 204A, 206A may be used to resolve the inconsistency.

Any of the data structure stored in the storages may be implemented using any numbers and types of data structures (e.g., lists, tables, linked lists, database, etc.).

Figure 3:
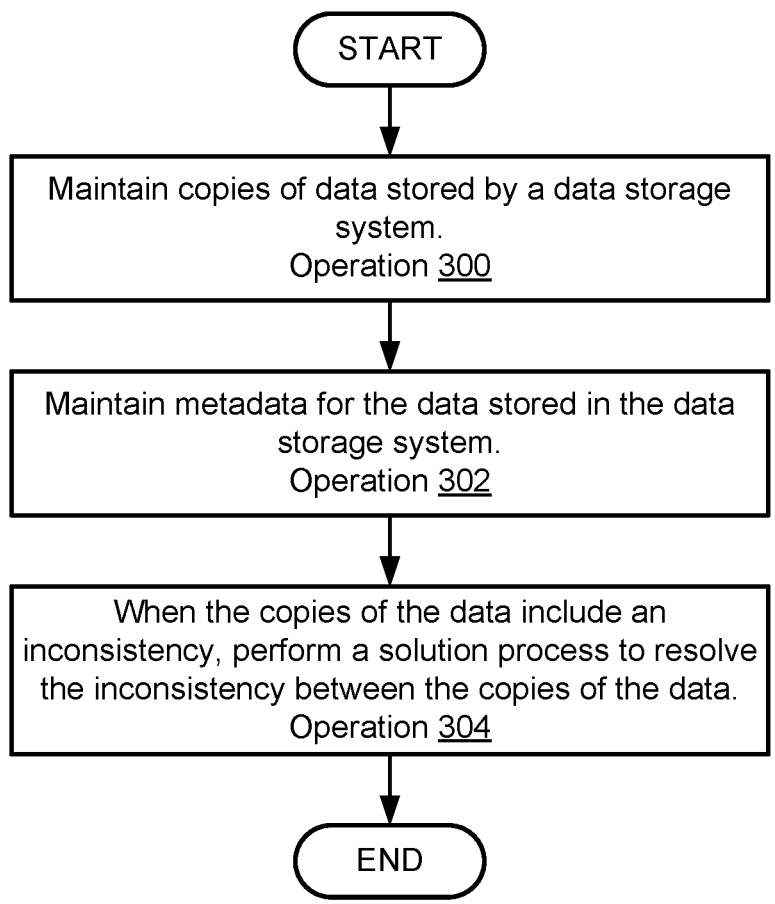
FIG. 3 shows a flow diagram illustrating a method of operating a data storage system in accordance with an embodiment.

As discussed above, the components of FIG. 1 may perform various methods to resolve inconsistencies in copies of stored data. FIG. 3 illustrate an example method that may be performed by the components of FIG. 1. In the diagrams discussed below and shown in these figures, any of the operations may be repeated, performed in different orders, omitted, and/or performed in parallel with or a partially overlapping in time manner with other operations.

Turning to FIG. 3A, a flow diagram illustrating a method of managing data storage in accordance with an embodiment is shown. The method may be performed, for example, by a storage system and/or other components illustrated in FIG. 1.

At operation 300, copies of data stored by a data storage system are maintained. The copies of the data may be maintained by attempting to maintain two copies of the data in two storage nodes. To maintain the copies of the data, writes to the data stored in the data storage system may be mirrored to each of the storage nodes of the data storage system.

The data stored in the storage system may be obtained from, for example, users of the storage system, other devices such as data processing system, etc.

At operation 302, metadata for the data stored in the data storage system is maintained. The metadata for the data in the data storage system may be maintained by maintaining three copies of the metadata (e.g., stored in two storage nodes and a support node). The metadata may indicate various information regarding corresponding portions of the data. The information regarding the corresponding portions of the data may be usable to resolve inconsistencies between the copies of the data stored in the storage node. For example, the metadata may include descriptions of the portion of the data (e.g., timestamps, sizes, etc.), etc.

At operation 304, when the copies of the data include an inconsistency, a resolution process is performed to resolve the consistency. The resolution process may include a voting process by each of the storage nodes and the support node. Each of these nodes may case a vote regarding portions of the copies of the data (e.g., that are inconsistent) with respect to which copy is correct. For example, the support node may compare its metadata to the metadata maintained by the other support nodes and/or to the corresponding portion of the copies of the data to identify which of the copies is more likely to be accurate. The support node may vote for the storage node hosting the copy of the portion of the data that is more likely to be accurate. Each of the storage nodes may vote for itself. Thus, the support node's vote may break deadlock and identify how to resolve the inconsistency (e.g., to adopt portions of the data from one of the copies as being a correct representation of the data that the storage system is managing).

Once identified, the inconsistency may be resolved by modifying the copies of the data of the storage nodes to match the data deemed to be correct.

The method may end following operation 304.

Using the method illustrated in FIG. 3, a data storage system in accordance with an embodiment may proactively address inconsistencies in stored data. By including an integrated support node, the data storage system may not need to rely on other devices for resolving deadlock.

Figure 4:
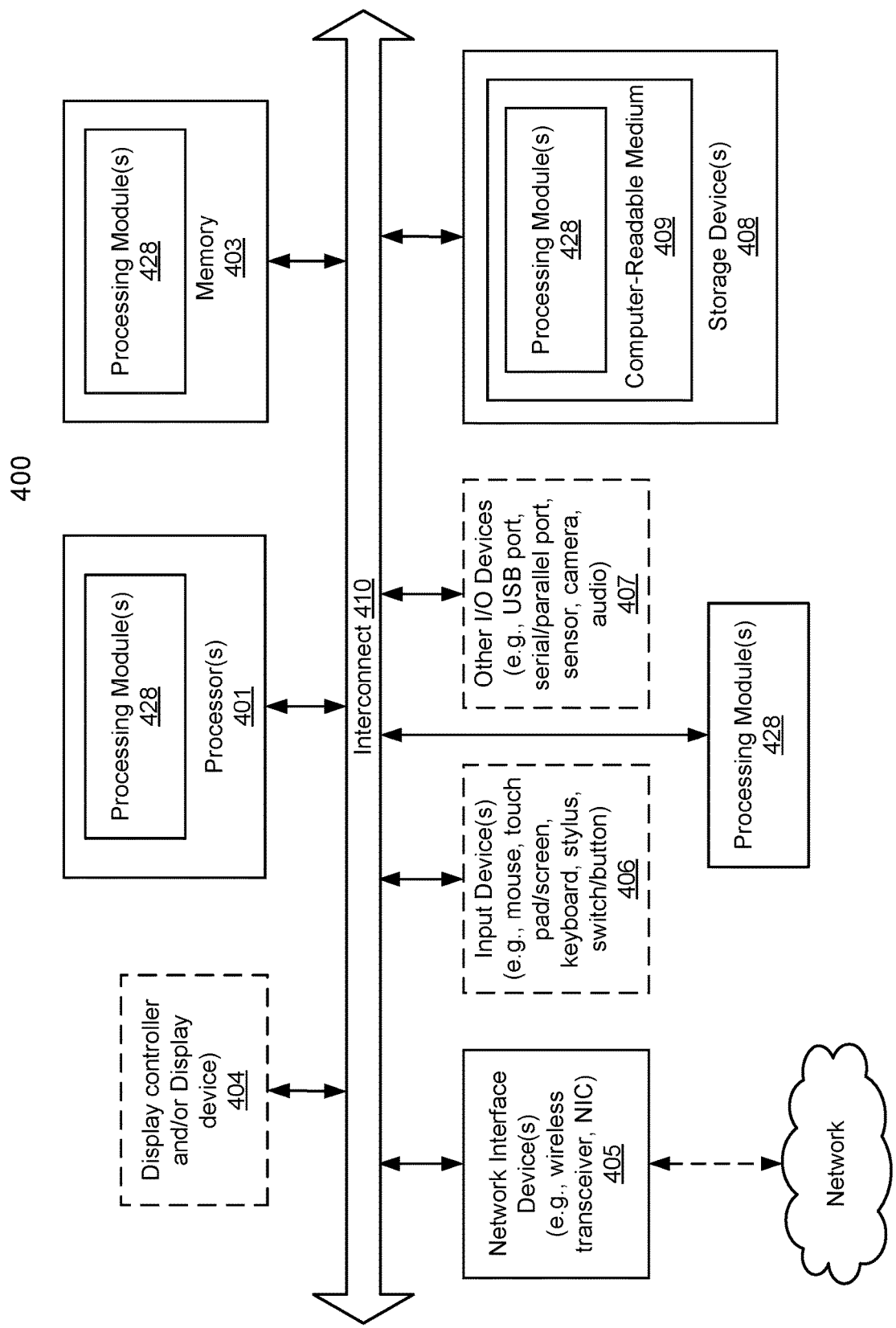
FIG. 4 shows a block diagram illustrating a computing device in accordance with an embodiment.

As discussed with respect to FIG. 1, data processing system 100 and various nodes of software defined storage system 102 may be implemented with computing devices. Turning to FIG. 4, a block diagram illustrating an example of a computing device in accordance with an embodiment is shown. For example, system 400 may represent any of the data processing systems and/or computing devices described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-430 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A data storage system, comprising:
a chassis;
a first storage node positioned in the chassis, the first storage node being adapted to maintain a first copy of data stored by the data storage system;
a second storage node positioned in the chassis, the second storage node being adapted to maintain a second copy of the data stored by the data storage system; and
a support node positioned in the chassis, the support node being adapted to:
maintain metadata for the data stored in the data storage system;
when the first storage node and the second storage node have an inconsistency in the data stored by the data storage system, participate in a resolution process to resolve the inconsistency between the first copy of the data and the second copy of the data, the resolution processing comprising a quorum based voting process that comprises making a determination using the metadata regarding whether the first copy of the data or the second copy of the data comprises an inconsistency with the data stored by the data storage system.

2. The data storage system of claim 1, further comprising:
a data management service hosted by the data storage system, the data management service being adapted to:
in a first instance of the determination where the first copy of the data is inconsistent with the data stored on the data storage system, update the first copy of the data to be consistent with the second copy of the data; and
in a second instance of the determination where the second copy of the data is inconsistent with the data stored on the data storage system, update the second copy of the data to be consistent with the first copy of the data.

3. The data storage system of claim 2, wherein the data management service is a distributed application that operates using computing resources of the first storage node, the second storage node, and the support node.

4. The data storage system of claim 1, wherein the support node does not store any copies of the data of the data storage system.

5. The data storage system of claim 4, wherein the support node comprises fewer computing resources than the first storage node, and the support node comprises fewer computing resources than the second storage node.

6. The data storage system of claim 5, wherein each of the first storage node, the second storage node, and the support node comprise a data processing system, the data processing system comprising independent computing resources managed by software hosted by the data processing system.

7. The data storage system of claim 1, wherein the chassis comprises a panel through which the first storage node, the second storage node, and the support node may be physically accessed.

8. The data storage system of claim 7, wherein the support node occupies less than 10% of an area of the panel.

9. The data storage system of claim 8, wherein the support node occupies less than 10% of a volume of an interior of the chassis.

10. The data storage system of claim 9, further comprising:
a power supply that provides power to at least one of the first storage node, the second storage node, and the support node.

11. A method for operating a data storage system, the data storage system comprising a chassis, a first storage node positioned in the chassis, a second storage node positioned in the chassis, and a support node positioned in the chassis, the method comprising:

maintaining, by the first storage node, a first copy of data stored by the data storage system;

maintaining, by the second storage node, a second copy of the data stored by the data storage system;

maintaining, by the support node, metadata for the data stored in the data storage system; and when the first storage node and the second storage node have an inconsistency in the data stored by the data storage system, participating, by the support node, in a resolution process to resolve the inconsistency between the first copy of the data and the second copy of the data, the resolution process comprising a quorum based voting process that comprises making a determination using the metadata regarding whether the first copy of the data or the second copy of the data comprises an inconsistency with the data stored by the data storage system.

12. The method of claim 11, further comprising:

in a first instance of the determination where the first copy of the data is inconsistent with the data stored on the data storage system, updating the first copy of the data to be consistent with the second copy of the data; and in a second instance of the determination where the second copy of the data is inconsistent with the data stored on the data storage system, updating the second copy of the data to be consistent with the first copy of the data.

13. The method of claim 12, wherein the first copy of the data is updated by a data management service comprising a distributed application that operates using computing resources of the first storage node, the second storage node, and the support node.

14. The method of claim 11, wherein the support node occupies less than 10% of an area of a panel of the chassis, the first storage node, the second storage node, and the support node being accessible via the panel.

15. The method of claim 11, wherein the support node occupies less than 10% of a volume of an interior of the chassis.

16. The method of claim 11, wherein the data storage system further comprises:

a power supply that provides power to at least one of the first storage node, the second storage node, and the support node.

17. The method of claim 12, wherein the updating of the first copy of the data and the updating of the second copy of the data are performed by a data management service hosted by the data storage system.

18. The method of claim 11, wherein the support node does not store any copies of the data of the data storage system.

19. The method of claim 18, wherein the support node comprises fewer computing resources than the first storage node, and the support node comprises fewer computing resources than the second storage node.

20. The method of claim 19, wherein each of the first storage node, the second storage node, and the support node comprise a data processing system, the data processing system comprising independent computing resources managed by software hosted by the data processing system.

* * * * *